United States Patent
Lev et al.

(10) Patent No.: US 8,958,204 B2
(45) Date of Patent: Feb. 17, 2015

(54) LEAKAGE CURRENT DISSIPATION DEVICES

(75) Inventors: Jeffrey A. Lev, Tomball, TX (US); Earl W. Moore, Cypress, TX (US); Mark S. Tracy, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 512 days.

(21) Appl. No.: 13/055,737

(22) PCT Filed: Jul. 25, 2008

(86) PCT No.: PCT/US2008/071148
§ 371 (c)(1),
(2), (4) Date: Jan. 25, 2011

(87) PCT Pub. No.: WO2010/011228
PCT Pub. Date: Jan. 28, 2010

(65) Prior Publication Data
US 2011/0122562 A1   May 26, 2011

(51) Int. Cl.
*G06F 1/16* (2006.01)
*G06F 1/18* (2006.01)

(52) U.S. Cl.
CPC .............. *G06F 1/166* (2013.01); *G06F 1/1616* (2013.01); *G06F 1/1656* (2013.01); *G06F 1/182* (2013.01)
USPC .............................. 361/679.55; 361/679.59

(58) Field of Classification Search
CPC .............................. G06F 1/166; G06F 1/1656
USPC ........................ 361/679.55, 679.59
See application file for complete search history.

(56) References Cited

U.S. PATENT DOCUMENTS

| | | | |
|---|---|---|---|
| 5,336,848 A | 8/1994 | Katz | |
| 5,644,320 A * | 7/1997 | Rossi | 343/702 |
| 5,804,762 A | 9/1998 | Jones | |
| 6,388,893 B1 | 5/2002 | Calderon | |
| 6,498,719 B1 * | 12/2002 | Bridges | 361/679.34 |
| 6,809,916 B2 * | 10/2004 | Nakata et al. | 361/115 |
| 7,106,580 B2 * | 9/2006 | Kugimiya et al. | 361/679.22 |
| 7,586,739 B2 * | 9/2009 | Weksler et al. | 361/679.26 |
| 2001/0009499 A1 * | 7/2001 | Carlson | 361/683 |
| 2003/0179543 A1 * | 9/2003 | Sri-Jayantha et al. | 361/683 |
| 2004/0025993 A1 * | 2/2004 | Russell | 150/154 |
| 2004/0257761 A1 | 12/2004 | Park | |

(Continued)

FOREIGN PATENT DOCUMENTS

| | | |
|---|---|---|
| CN | 101145072 | 3/2008 |
| DE | 60033982 | 12/2007 |
| JP | 09073349 | 3/1997 |
| KR | 0140470 | 5/1999 |
| KR | 1020030046731 | 6/2003 |

OTHER PUBLICATIONS

The International Search Report and the Written Opinion of the International Searching Authority for International Application No. PCT/US2008/071148 dated Apr. 15, 2009, pp. 11.

(Continued)

*Primary Examiner* — Adrian S Wilson
(74) *Attorney, Agent, or Firm* — Ceyda A. Maisami

(57) ABSTRACT

In some embodiments, computing device includes an outer housing having a bottom surface, and a leakage current dissipation device mounted to the bottom surface, the leakage current dissipation device being configured to dissipate leakage current generated by the computing device into a surface on which the computing device is supported.

18 Claims, 3 Drawing Sheets

(56) References Cited

U.S. PATENT DOCUMENTS

2006/0285285 A1* 12/2006 Tracy et al. .................. 361/683
2008/0049949 A1*  2/2008 Snider et al. ................... 381/86
2008/0074831 A1*  3/2008 Lee et al. ...................... 361/683
2008/0253081 A1* 10/2008 Tracy et al. .................. 361/687
2009/0268398 A1* 10/2009 Tang ........................ 361/679.55

OTHER PUBLICATIONS

Intellectual Property Office, Examination Report under Section 18(3), Appln No. 1020150.7, date of mailling Jan. 25, 2012, 3 p.
Intellectual Property Office, Examination Report under Section 18(3), Appln No. GB1020150.7, date of mailing Jun. 7, 2012, 3 p.

* cited by examiner

LEAKAGE CURRENT DISSIPATION DEVICES

BACKGROUND

Today, many notebook computers have metal outer housings. Due to the electrical conductivity of such housings, it is possible for leakage current generated by the computer's power system to reach the outer housing and discharge into the computer user, particularly when the computer is being powered with an ungrounded power cable connected to a wall outlet. In such a case, the user acts as a ground path for the computer into which the leakage current is discharged. Although such discharge is neither hazardous nor painful to the user, it is noticeable and can be unsettling.

BRIEF DESCRIPTION OF THE DRAWINGS

The disclosed leakage current dissipation devices can be better understood with reference to the following drawings. The components in the drawings are not necessarily to scale.

DETAILED DESCRIPTION

As described above, leakage current from a notebook computer's power system can be discharged into the computer user through the computer's housing, particularly when that housing is constructed of an electrically-conductive material, such as a metal. As described in the following, however, such discharge can be reduced or avoided by providing the computer with an integrated leakage current dissipation device that dissipates the leakage current into another object, such as a support surface on which the computer rests. In some embodiments, the leakage current dissipation device is mounted to the bottom surface of the base of a notebook computer and comprises a resilient member having an electrically-conductive outer surface that is coupled to a ground plane of the computing device.

Figure 1:
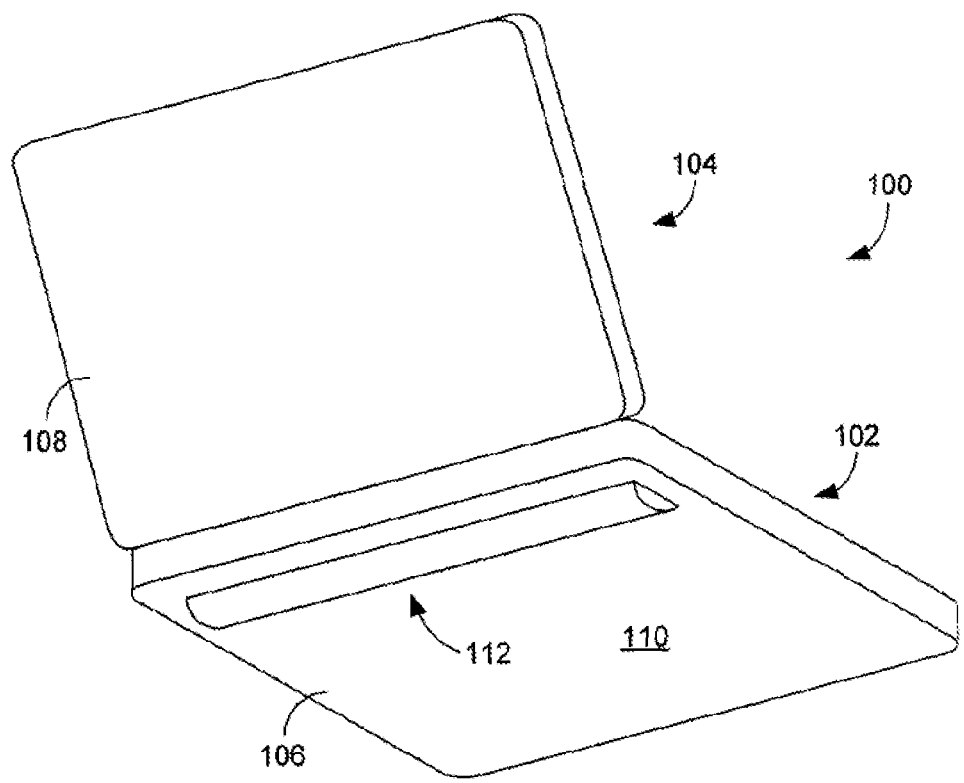
FIG. 1 is a bottom perspective view of an embodiment of a computing device having an Integrated leakage current dissipation device.
Figure 2:
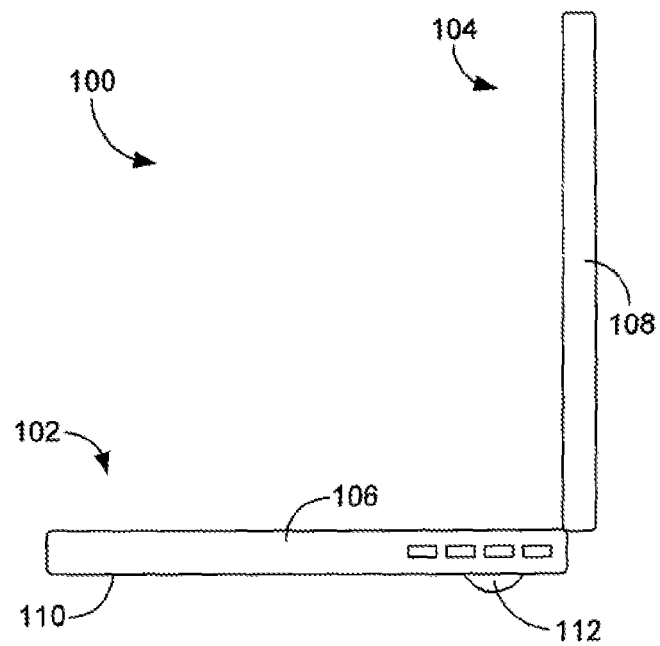
FIG. 2 is a side view of the computing device of FIG. 1.

Referring now in more detail to the drawings, in which like numerals indicate corresponding parts throughout the views, FIGS. 1 and 2 illustrate a computing device 100 in the form of a notebook or "laptop" computer. Although a notebook computer has been explicitly illustrated and identified, it is noted that the notebook computer is cited only as an example. Therefore, the teachings of the present disclosure equally apply to other computing devices that generate leakage current that could be discharged into the computer user.

As indicated in FIGS. 1 and 2, the computing device 100 includes a base 102 and a display 104 that are connected to each other. By way of example, the base 102 and display 104 are pivotally connected to each other with a hinge (not shown).

The base 102 includes an outer housing 106 that surrounds various internal components of the computing device 100, such as a processor, memory, hard drive, and the like. The display 104 includes its own outer housing 108, which supports a display device (not visible in FIG. 1). In some embodiments, at least the base outer housing 106 is at least partially composed of an electrically-conductive material, such as a metal. By way of example, the base outer housing 106 includes aluminum.

As depicted in FIGS. 1 and 2, the base 102 comprises a bottom surface 110 to which is mounted a leakage current dissipation device 112. In the illustrated embodiment, the leakage current dissipation device 112 is configured as an elongated member that extends along the bottom surface 110 in a transverse direction from one later side of the base 102 toward the other side (see FIG. 1). That configuration, however, is not required and alternative arrangements are possible.

Figure 3:
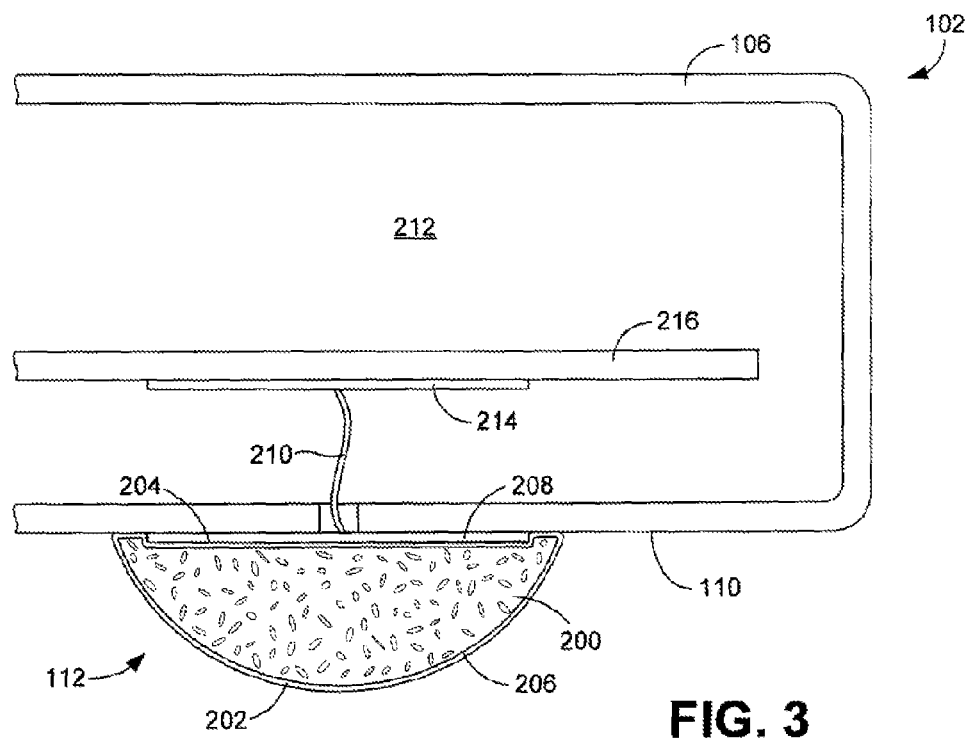
FIG. 3 is a partial cross-sectional side view of a base of the computing device of FIG. 1, illustrating electrical connection between the leakage current dissipation device and a ground plane of the computing device.
Figure 4:
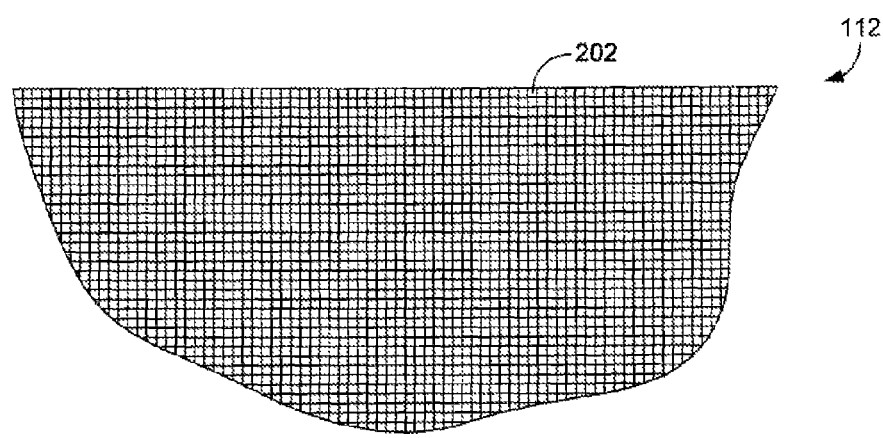
FIG. 4 is a partial plan view of the leakage current dissipation device shown in FIG. 1.

Referring next to FIG. 3, the leakage current dissipation device 112 can comprise a resilient inner member 200 that is at least partially surrounded by an electrically-conductive outer layer 202. In some embodiments, the inner member 200 comprises a foam, rubber, or gel member having a substantially planar inner surface 204 and a curved outer surface 206. In some embodiments, the outer layer 202 comprises a flexible metal gasket that is wrapped around the inner member 200. As indicated in the partial view of FIG. 4, the outer layer 202 can be constructed of a woven gasket material, such as a beryllium-copper weave.

With reference back to FIG. 3, the leakage current dissipation device 112 can further comprise an electrically-conductive pad 208 that facilitates both mounting of the leakage current dissipation device 112 to the base 102 and secure connection to an electrical conductor 210, such as a metal wire, which extends into an interior space 212 defined by the outer housing 106. As shown in FIG. 3 the conductor 210 extends from the leakage current dissipation device 112 (or from the pad 208) to a ground plane 214 of the computing device 100 that, in the illustrated embodiment, is provided on a printed circuit board 216.

Figure 5:
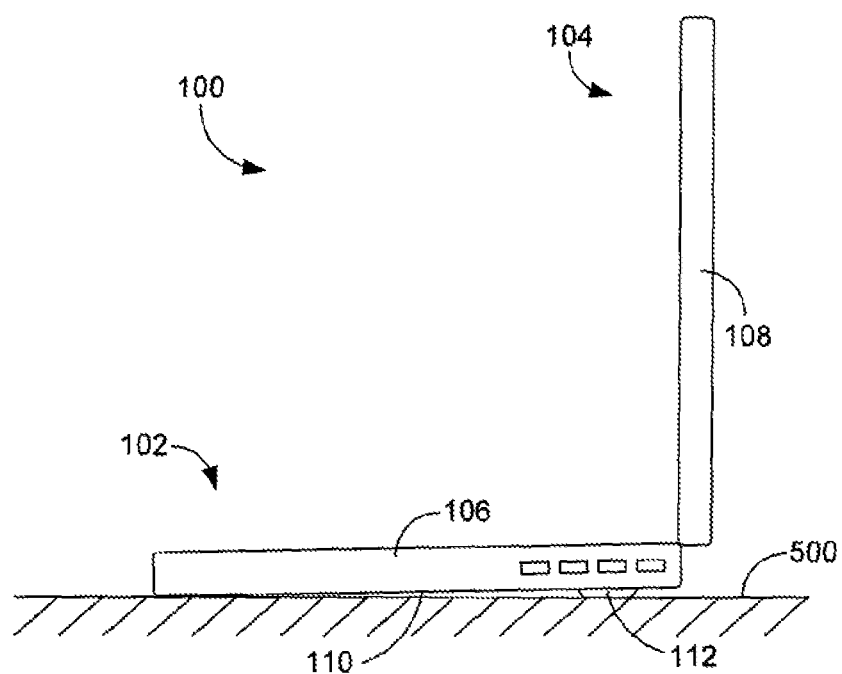
FIG. 5 is a side view of the computing device of FIG. 1, in which the computing device is shown resting upon and dissipating leakage current into a support surface.

FIG. 5 illustrates the computing device 100 resting upon a support surface 500, such as a table top. As is apparent in FIG. 5, the leakage current dissipation device 112 compresses under the weight of the computing device 100 so as to create a large surface area in contact with the support surface 500. When the computing device 100 is operating, and particularly when the computing device is operating using power supplied by an ungrounded power cable, leakage current is generated that could reach the outer housing 106 and could be discharged into a user of the computing device. Due to the presence of the leakage current dissipation device 112, however, that current is instead dissipated into the support surface 500 through the leakage current dissipation device. Although such dissipation occurs more quickly and more easily when the support surface 500 is highly electrically conductive, dissipation still occurs when the support surface is relatively non-electrically conductive given the relatively large area of contact between the leakage current dissipation device 112 and the support surface. If desired, the rate of such dissipation can be increased by providing an electrically-conductive plate or pad on the support surface 500 underneath the leakage current dissipation device 112.

In the foregoing disclosure, a leakage current dissipation device has been described as comprising a resilient inner member that is at least partially surrounded by an electrically-conductive outer layer. It is noted that alternative embodiments are possible. In one such embodiment, the leakage current dissipation device can comprise a conductive spring finger that extends from the base of the computing device.

The invention claimed is:

1. A computing device comprising:
   an outer housing having a bottom surface; and
   a leakage current dissipation device mounted to the bottom surface by an electrically-conductive pad positioned between the leakage current dissipation device and the bottom surface, the leakage current dissipation device being configured to dissipate leakage current generated by the computing device into a surface on which the computing device is supported.

2. The computing device of claim 1, wherein the computing device comprises a notebook computer and the bottom surface is a bottom surface of a base of the notebook computer.

3. The computing device of claim 1, wherein the outer housing comprises an electrically-conductive material.

4. The computing device of claim 3, wherein the electrically-conductive material is a metal.

5. The computing device of claim 4, wherein the metal is aluminum.

6. The computing device of claim 1, wherein the leakage current dissipation device comprises a resilient inner member.

7. The computing device of claim 6, wherein the leakage current dissipation device further comprises an electrically-conductive outer layer that surrounds the inner member.

8. The computing device of claim 6, wherein the inner member comprises a foam member.

9. The computing device of claim 7, wherein the outer layer comprises a flexible metal gasket.

10. The computing device of claim 9, wherein the flexible metal gasket is composed of a woven material.

11. The computing device of claim 10, wherein the flexible metal gasket comprises a beryllium-copper weave.

12. The computing device of claim 1, further comprising a conductor that electrically couples the electrically conductive pad to a ground plane of the computing device.

13. A notebook computer comprising:
    a display;
    a base connected to the display, the base comprising an outer housing that includes an electrically-conductive material, the outer housing defining an interior space and a bottom surface, a ground plane contained the interior space; and
    a leakage current dissipation device mounted to the bottom surface of the base outer housing by an electrically-conductive pad positioned between the leakage current dissipation device and the bottom surface, the leakage current dissipation device comprising a resilient inner member that is surrounded by an electrically-conductive outer layer, the outer layer being electrically coupled to the ground plane such that leakage current generated by the notebook computer flows to the leakage current dissipation device for discharging into a surface upon which the notebook computer is supported.

14. The notebook computer of claim 13, wherein the inner member comprises a foam member.

15. The notebook computer of claim 14, wherein the outer layer comprises a flexible metal gasket.

16. A leakage current dissipation device for use with a notebook computer, the leakage current dissipation device comprising;
    an electrically-conductive pad positioned between the leakage current dissipation device and a bottom surface of the notebook computer;
    a resilient inner member; and
    a flexible metal gasket that surrounds the inner member.

17. The dissipation device of claim 16, wherein the inner member comprises a foam member.

18. The dissipation device of claim 17, wherein the flexible metal gasket comprises a woven metal gasket.

* * * * *